United States Patent [19]

Wolters

[11] 4,250,034
[45] Feb. 10, 1981

[54] TRANSPORT CONDUIT

[75] Inventor: Tjako A. Wolters, Zeist, Netherlands

[73] Assignees: Ballast-Nedam Groep N.V., Amstelveen; Amsterdamse Ballast Bagger, Utrecht, both of Netherlands

[21] Appl. No.: 5,716

[22] Filed: Jan. 23, 1979

[30] Foreign Application Priority Data

Jan. 26, 1978 [NL] Netherlands .......................... 7800935

[51] Int. Cl.³ .............................................. E02F 5/28
[52] U.S. Cl. .................................... 210/170; 210/435; 210/416.1
[58] Field of Search ............... 210/153, 162, 232, 234, 210/247, 251, 322, 340, 341, 343, 344, 405, 406, 416 R, 417, 418, 420, 421, 435, 445, 453, 455, 456, 459, 462, 463, 170, 1 G; 137/236; 37/54, 58, 59, 61–63

[56] References Cited

U.S. PATENT DOCUMENTS

| 1,950,983 | 3/1934 | Henneboale | 210/341 |
| 2,019,169 | 10/1935 | Blacklund | 210/341 |
| 2,068,468 | 1/1937 | Phillips | 210/340 |

FOREIGN PATENT DOCUMENTS 731697 1/1943 Fed. Rep. of Germany .

Primary Examiner—Frank Sever
Attorney, Agent, or Firm—John P. Snyder

[57] ABSTRACT

A transport conduit comprises a stone catcher housing having a grid basket arranged in it. The stones sticking in the meshes of the grid basket are flushed out of it or they are getting loosened when removing the basket from the housing.

2 Claims, 18 Drawing Figures

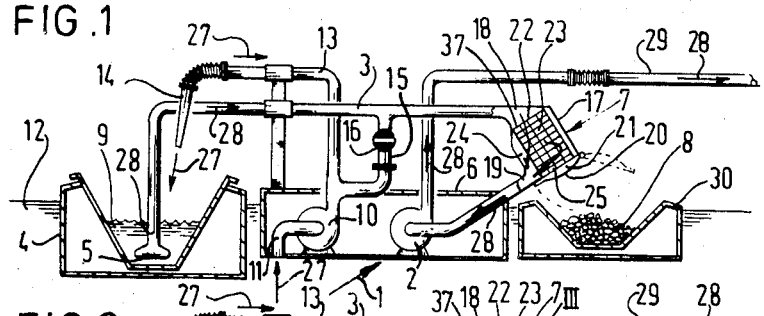
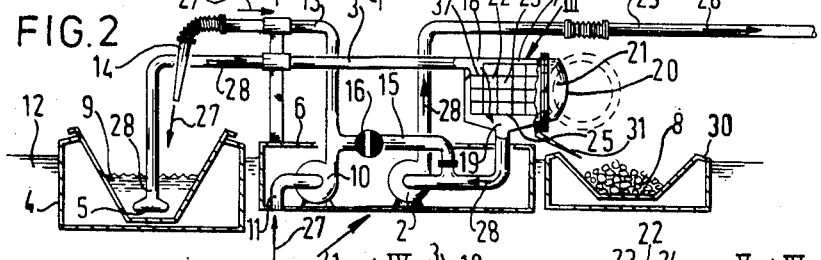
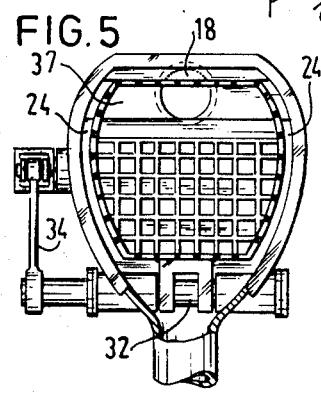
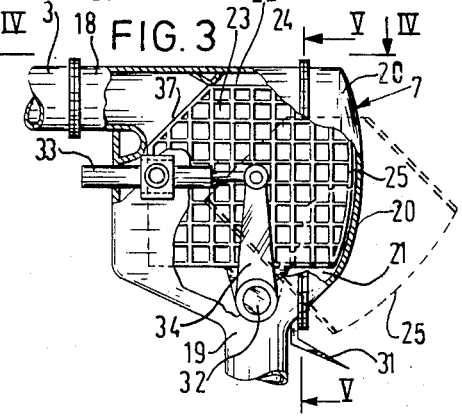
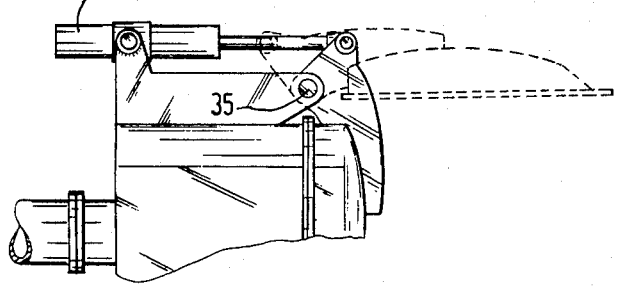

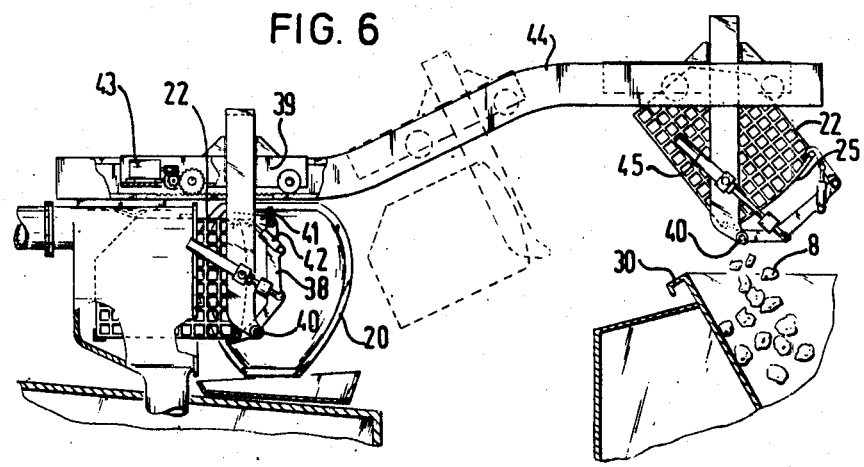
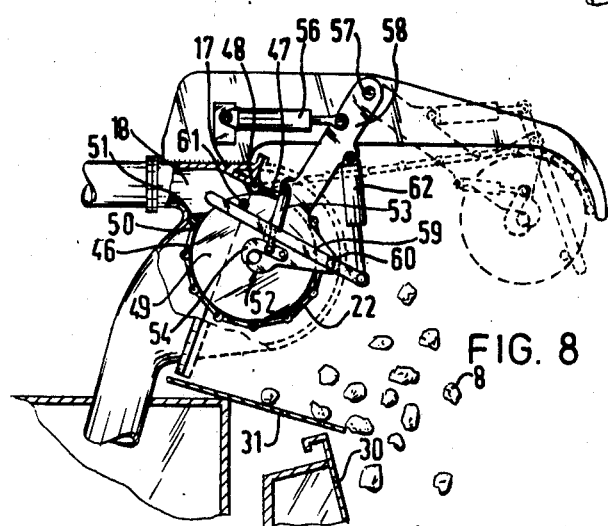
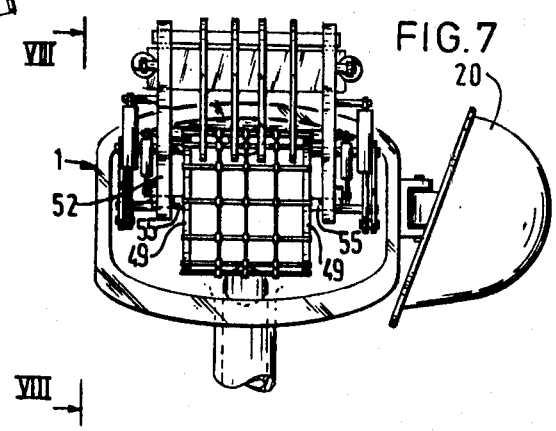

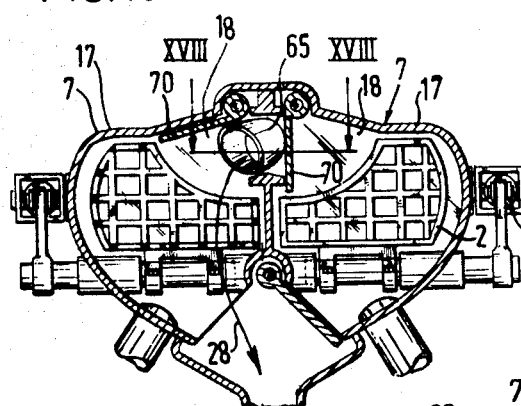
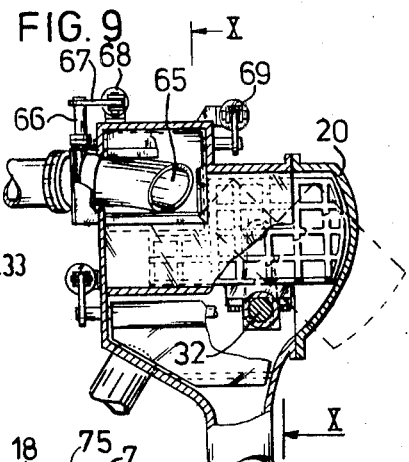
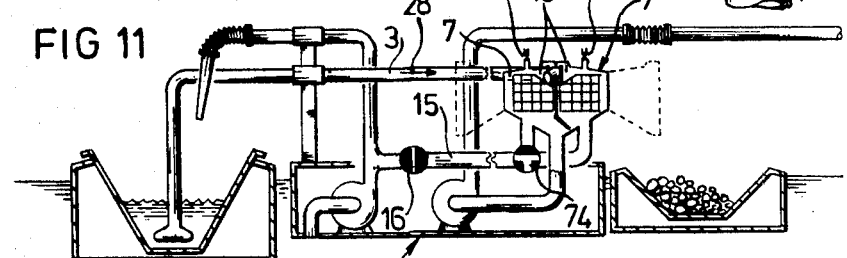
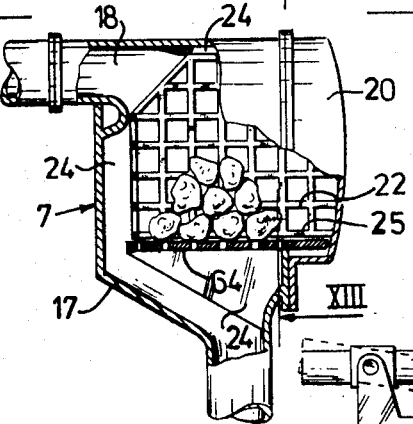
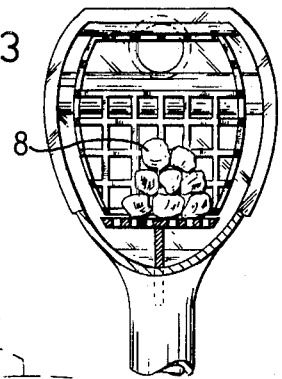
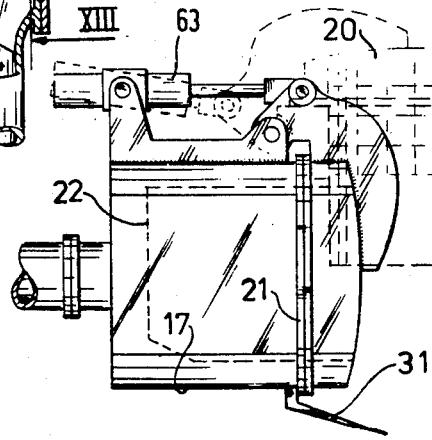

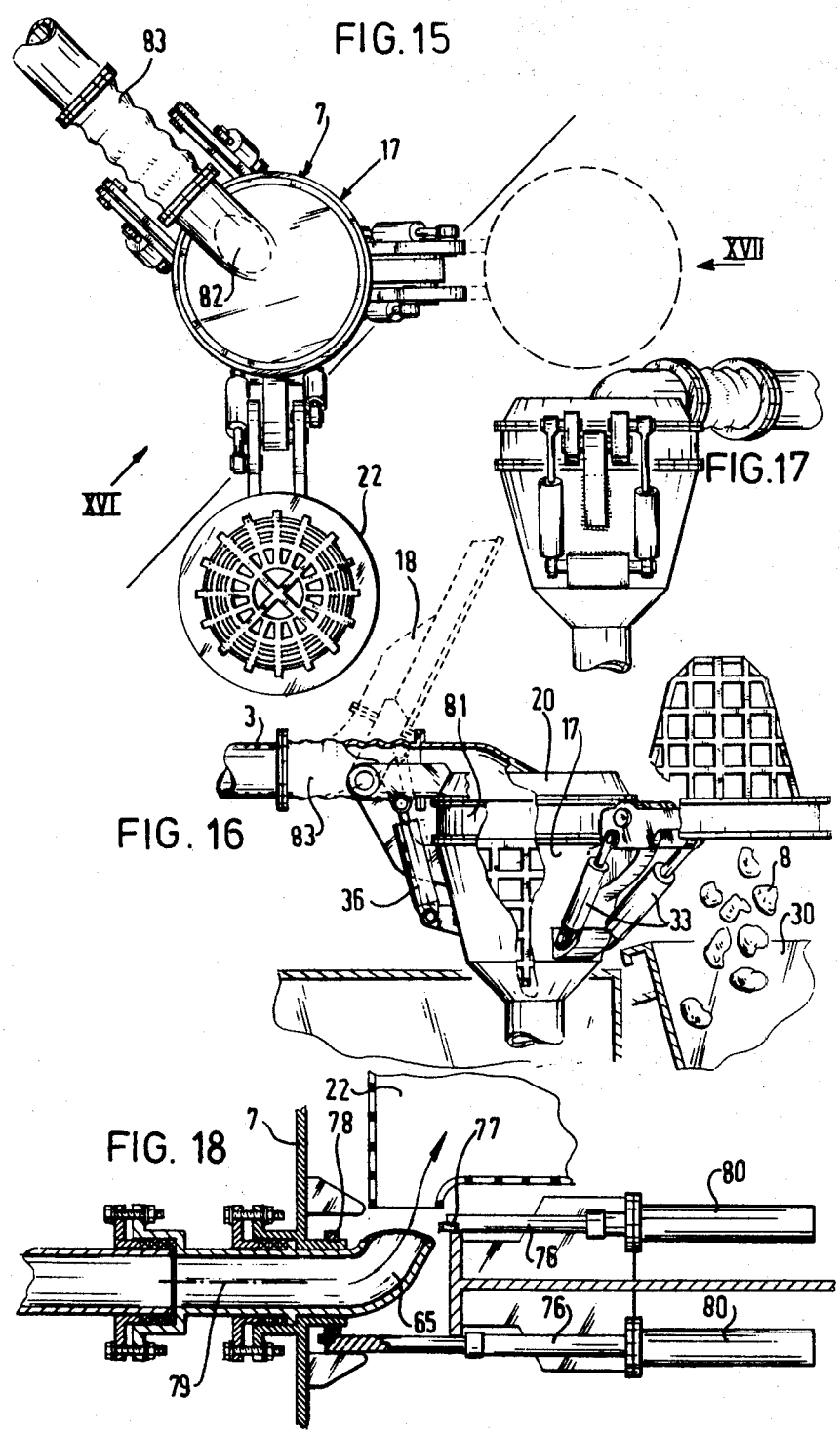

TRANSPORT CONDUIT

The invention relates to a transport conduit including a suction pipe connected with a pump, carried by a floating body and having a nozzle and at least one stationary stone catcher included in the suction pipe and disposed on deck for sieving out large stones and/or other large objects from the dredged material, for example, spoil, said stone catcher comprising a stone catcher housing having a mixture inlet, a mixture outlet and a stone outlet povided with a door hermetically closed against the open air and hinged to the stone catcher housing, which is provided with a grid basket to be traversed from a high to a low level and surrounded by an outlet chamber to be traversed by the mixture and opening out in a mixture outlet.

A transport conduit of the kind set forth is known from German patent specification No. 731,697. Herein the grid basket is stationarily arranged in the stone catcher housing. It is an onerous and time-consuming job to release the stones clamped tight in the meshes of the grid basket.

The invention provides in this respect an improvement in the transport conduit of the kind set forth in the preamble, in that the stone catcher housing is provided with additional discharge means permanently fixed thereto for loosening the stones collected in the grid basket.

The additional discharge means may comprise a flushing duct communicating with the outlet chamber for flushing away the objects and/or sticky mass obturating the meshes of the grid basket and/or the additional discharge means may comprise pivotal means for turning the grid basket between a working position inside the stone catcher housing and a discharge position outside the stone catcher housing. This pivotal movement is preferably accompanied by jolts and/or vibrations in order to loosen the stones from the meshes.

A particularly short interruption of the suction process is ensured, when at least one stone catcher housing is provided with at least two grid baskets, which can be alternately moved between a working position inside the housing and a discharge position outside the housing with the aid of additional discharge means.

The stones can be more readily removed from the meshes of the basket, when the stone catcher comprises at least one grid basket consisting of a flexible net, which is deformable between a basket-like working position and a substantially straightened discharge state.

The aforesaid and further features of the invention will be described more fully hereinafter with reference to a drawing.

In the drawing show schematically:

FIG. 1 a scoop dredger according to the invention,

FIGS. 2 and 11 each a further development of a scoop dredger according to the invention, FIG. 3 a developed, enlarged view of a further development of detail III of FIG. 2, FIG. 4 an elevational view in the direction of the arrows IV in FIG. 3, FIG. 5 a sectional view taken on the line V—V in FIG. 3, FIGS. 6, 7, 9, 12 and 15 each a fraction III of individually different scoop dredgers in accordance with the invention, FIG. 8 a developed view in the direction of the arrows VIII in FIG. 7, FIG. 10 a sectional view taken on the line X—X in FIG. 9, FIG. 13 is a sectional view taken on the line XIII—XIII in FIG. 12, FIG. 14 a plan view in the direction of the arrows XIV in FIG. 12, FIG. 16 an elevational view in the direction of the arrows XVI in FIG. 15, FIG. 17 an elevational view in the direction of the arrows XVII in FIG. 15, and FIG. 18 a sectional view taken on the line XVIII—XVIII of a variant of the detail of FIG. 10.

The scoop dredger 1 of FIG. 1 comprises a suction pipe 3 connected with a pump 2 and having a nozzle 5 to be lowered into a trough 4 to be discharged and a stone catcher 7 included in the suction pipe 3 and disposed on the deck 6 of the scoop dredger 1 for sieving out stones 8 and/or other large objects contained in the dredger material 9 sucked up through the nozzle 5 from the trough 4. The floating hopper 4 containing, in the filled state, mainly only spoil, for example, sand and a few stones, can be emptied by suction when an adequate quantity of water is present in the hopper 4. For this purpose the scoop dredger 1 comprises a water pump 10, which is in communication through a duct 11 with the outboard water 12 and which sprays the water 12 through a duct 13 and a spray nozzle 14 into the hopper 4. In addition, the pump 10 is connected through a duct 15 including a closing member 16 with the suction pipe 3 in order to fill the latter with water in the open position of the closing member 16 at the beginning of the suction process. The stone catcher 7 comprises a stone catcher housing 17, which has a spoil inlet 18, a spoil outlet 19 and on the side and/or at the bottom a stone discharge opening 21 provided with a door 20 and which is provided with a stone store 23 accommodated in a grid basket 22. The grid basket 22 is surrounded by an outlet chamber 24 to be traversed by the spoil 9, which communicates with the spoil outlet 19 and which has a stone outlet 25 hermetically closed by a wall of the housing 17 against the open air. Said wall of the housing 17 is formed by the door 20.

In operation water is pumped in the direction of the arrows 27 into the hopper 4 and the spoil 9 together with the water 12 is pumped in the direction of the arrows 28 across the stone catcher 7 by means of the pump 2 through an outlet duct 29 towards a place of destination, whilst the stones are sieved out of the spoil in the stone catcher 7. Since the grid basket 22 is surrounded by the outlet chamber 24, the spoil stream can pass readily through the stone catcher 7 in the direction of the arrows 28 even when the grid basket 22 is appreciably filled. For emptying the grid basket 22 the suction process is interrupted, the door 20 is opened so that the stones 8 contained therein automatically drop into a stone trough 30 positioned at the side of the scoop dredger 1 and the suction process is restarted after the door 20 is closed and the suction pipe 3 is filled with the water 12.

The scoop dredger 1 of FIG. 2 is substantially identical to that of FIG. 1, the difference being that the stone catcher 7 is disposed in a horizontal position and more suitably on board, whilst beneath the stone outlet opening 21 a guide plate 31 is provided. The duct 15 between the pump 2 and the stone catcher 7 communicates furthermore with the suction pipe 3 in order to flush the grid basket 22 with the water 12, when the door 20 is opened and thus to loosen the stones 8 jammed in the meshes of the grid basket 22 opposite the normal suction direction 28. Moreover, the stone catcher 7 can thus be better vented. The stone catchers shown in FIGS. 1 and 2 are immovably arranged in the housing 17, but the grid basket 22 is preferably movable into and out of the housing 17 through the stone outlet opening 21 provided in the side and/or the bottom of the housing 17.

The stone catcher 7 shown in FIGS. 3 to 5 comprises a grid basket 22 which is fixedly connected with a shaft 32 pivotally journalled in the housing 17, which can be turned by means of a hydraulic cylinder 33 acting on an arm 34 of the shaft 32 in order to turn the grid basket 22 into the position indicated by broken lines, when the door 20 is opened. The door 20 is pivotable about a pivotal shaft 35 by means of a hydraulic cylinder 36. The grid basket 22 has a stone outlet 25, which is cllosed by the door 20 during the suction process so that in the position indicated by broken lines the grid basket 22 is open on the bottom side. The grid basket 22 has furthermore an inlet opening 37 communicating with the spoil feed 18 and having a size at least equal to the passage of the suction pipe 3. During the discharge of the stones 8 out of the grid basket 22 the latter can be shaken shockwise with the aid of the cylinder 33 in order to loosen the stones 8 from the meshes of the grid basket 22. The grid basket 22 of FIG. 3 can be turned by means of the discharge means formed by the cylinder 33 between a working position indicated by solid lines in the housing 17 and a discharge position indicated in FIG. 3 by broken lines outside the housing 17.

FIG. 6 shows that it is also possible, however, to convey the grid basket 22 out of the housing 17, when the door 20 is opened, by means of a grab 38, which is tiltably suspended to a grab carriage 39. When the door 20 is open, a movable clamping jaw 41 can grasp the grid basket 22 by means of a hydraulic cylinder 42 after which the grab carriage 39 is displaced by means of an electric driving motor 43 along a rail 44 extending out of the board and beyond it to a higher level. At this place the grid basket 22 is tilted about a low-level tilting shaft 40 by means of a hydraulic cylinder 45 so that the stones 8 can drop from the basket 22 through the stone outlet 25 into a stone trough 30, which may be high.

The stone catcher 7 of FIGS. 7 and 8 comprises a grid basket 22 formed by a flexible net 46, which is deformable between a basket-like working state indicated in FIG. 8 by broken lines and a staight discharge state indicated in said Figure by broken lines. The net 46 is pivoted at one end 47 near the spoil inlet 18 to the housing 17 around a shaft 48 and is wound around two end discs 49, whilst its other end 50 is secured to discs 49 around a shaft 51. When the door 20 is opened, two grabs 52 grasp by their movable clamping jaws 54 energized by a hydraulic cylinder 53 stub shafts 55 of the discs 49. The grabs 52, fastened to arms 58, which are pivotable by means of hydraulic cylinders 56 about shafts 57, are moved beyond the board into the position indicated by broken lines so that the net 46 is wound off and stretched so that the stones 8 drop along the guide plate 31 into the stone tray 30. In order to prevent the net 46 from sagging in the straightened state and in order to ensure that the net 46 winds up to form a stone basket, each disc 49 has pivoted to it an arm 59, which is pivotable about a hinge 60. This arm 59 is supported by a stationary lug 61 of the associated disc 49 and is acted upon by air spring 62 in the form of a pneumatic cylinder, which urges the arm 59 against the lug 61.

In order to reduce the number of movable parts of the stone catcher 7, the stone catcher 7 of FIGS. 12 to 14 has a grid basket 22 which is rigidly connected with the door 20 so that at the turn of the door 20 the grid basket 22 is directly moved through the stone outlet opening 21 of the housing 17 into the discharge position indicated in FIG. 14 by broken lines by means of a hydraulic cylinder 63. The stone outlet 25 of the grid basket 22 slides along a perforated, stationary bottom 64 of the housing 17.

In order to reduce the time of interruption of the suction process the scoop dredger 1 preferably comprises two stone catchers 7 arranged side by side and connected with a common suction pipe 3 through a displaceable nozzle 65 arranged near the stone catchers 7 and alternately opening out in one of the two spoil inlets 18 of these stone catchers 7. The nozzle 65 is adapted to turn about a pivotal shaft 66 by means of an arm 67 with the aid of a hydraulic cylinder 68. The nozzle 65 is arranged between two flaps 70 closing the housings 17 by means of a hydraulic cylinder 69 each. In FIG. 10 the stone catcher 7 indicated on the left-hand side is included in the suction pipe 3 as indicated in FIG. 11. In the meantime the right-hand stone catcher 7 can be relieved from the collected stones 8, when the door 20 is opened, by turning the grid basket 22 with the aid of the hydraulic cylinder 33 about the shaft 32. After the closure of the door 20, when the closing member 16 is opened and a three-way cock 74 is in the position shown in FIG. 11, the right-hand stone catcher 7 can be filled with water whilst it is vented through a vent valve 75.

The flaps 70 are preferably replaced by slides 76 as shown in the variant of the detail of FIG. 18. At the end of each slide 76 a knife 77 may be provided which co-operates in scissor-like fashion with a counter-knife 78 in order to cut off any elongated object extending from the nozzle 65 into the grid basket 22, for example, a steel wire when the tone catcher housing 17 is closed by the slide 76. It is thus ensured that the nozzle 65 can be turned about its longitudinal axis 79. The slides 76 are actuated by high-power hydraulic cylinders 80.

The stone catcher 7 of FIGS. 15 to 17 comprises a stone catcher housing 17 having two grid baskets 22 alternately located inside and outside the housing 17. Each grid basket 22 has at the top end a ring 81 joining the housing 17 and forming a junction between the housing 17 and the door 20. When the door 20 is opened, a grid basket 22 can be turned by means of hydraulic cylinders 33 out of the housing 17 and be tilted over for discharging the stones 8 along the top side into a stone trough 30. The spoil inlet 18 communicates on the one hand with an opening 82 of the door 20 and on the other hand through a hose 83 with the suction pipe 3 so that the door 20 can be turned by means of hydraulic cylinders 36, whilst the connection of the suction pipe 3 with the door 20 is maintained. FIG. 15 shows that the grid baskets 22 can be turned in orthogonal positions beyond the board as far as above a high stone trough 30.

The filling duct 15 may be used, if desired, as a flushing duct with substantially all stone catchers 7 in order to loosen the stones 8 by the flow from the meshes of the grid basket 22 opposite the direction 28.

What is claimed is:

1. A transport conduit including a suction pipe connected with a pump, carried by a floating body and having a nozzle and at least one stationary stone catcher included in the suction pipe and disposed on deck for sieving out large stones and/or other large objects from the dredged material, for example, spoil, said stone catcher comprising a stone catcher housing having a mixture inlet, a mixture outlet and a stone outlet provided with a single door hermetically closed against the open air and hinged to the stone catcher housing, which is provided with a grid basket to be traversed from a high to a low level and surrounded by an outlet chamber to be traversed by the mixture and opening out in said mixture outlet, said stone catcher housing being provided with additional discharge means permanently fixed thereto for loosening the stones collected in the grid basket, said additional discharge means comprising a flushing duct communicating with said housing.

2. A system for transporting dredged material, which comprises a container having a supply of dredged material which contains large objects such as stones, pump means for supplying water to said container in such quantity as to fluidize the dredged material, a suction nozzle disposed within said container for picking up a fluid suspension of the dredged material, a suction pump having an inlet connected to said suction nozzle and an outlet delivering a stream of fluidized dredged material, and stone catcher means located between said inlet of the suction pump and said suction nozzle for removing said large objects before reaching said suction pump, said stone catcher means comprising a housing having an inlet connected to said suction nozzle and an outlet connected to the inlet of said suction pump, a grid basket within said housing and defining a chamber between the grid basket and said housing in surrounding relation to the grid basket and communicating with the outlet of the housing, the inlet of said housing being adjacent the uppermost part thereof and the outlet of the housing being adjacent the lowermost part thereof and said grid basket having an upper opening cooperating with the inlet of the housing so that the large objects retained within the grid basket minimally impede the flow of fluidized dredged material to said outlet chamber, said housing also having a stone discharge opening and including a single door cooperating with said stone discharge opening and with said grid basket to allow large objects to be discharged therefrom when the door is open, and conduit means connected to said pump means and said housing for forcibly removing accumulated large objects from said grid basket when said door is open.

* * * * *

UNITED STATES PATENT AND TRADEMARK OFFICE
CERTIFICATE OF CORRECTION

PATENT NO. : 4,250,034
DATED : February 10, 1981
INVENTOR(S) : Tjako Aaldrik Wolters It is certified that error appears in the above—identified patent and that said Letters Patent is hereby corrected as shown below:

[73] Assignees: Ballast-Nedam Groep N.V., Amsterdamse Ballast Bagger en Grond (Amsterdam Ballast Dredging) B.V. and Scheepswerf en Machinefabriek "De Liesbosch" B.V. at Amstelveen and Utrecht, the Netherlands.

Signed and Sealed this

Twenty-first Day of April 1981

[SEAL]

Attest:

RENE D. TEGTMEYER

Attesting Officer   Acting Commissioner of Patents and Trademarks